Nov. 24, 1953  A. P. DOWLING  2,660,051
DEVICE FOR TESTING HOT FLOW
Filed May 15, 1951  2 Sheets-Sheet 1
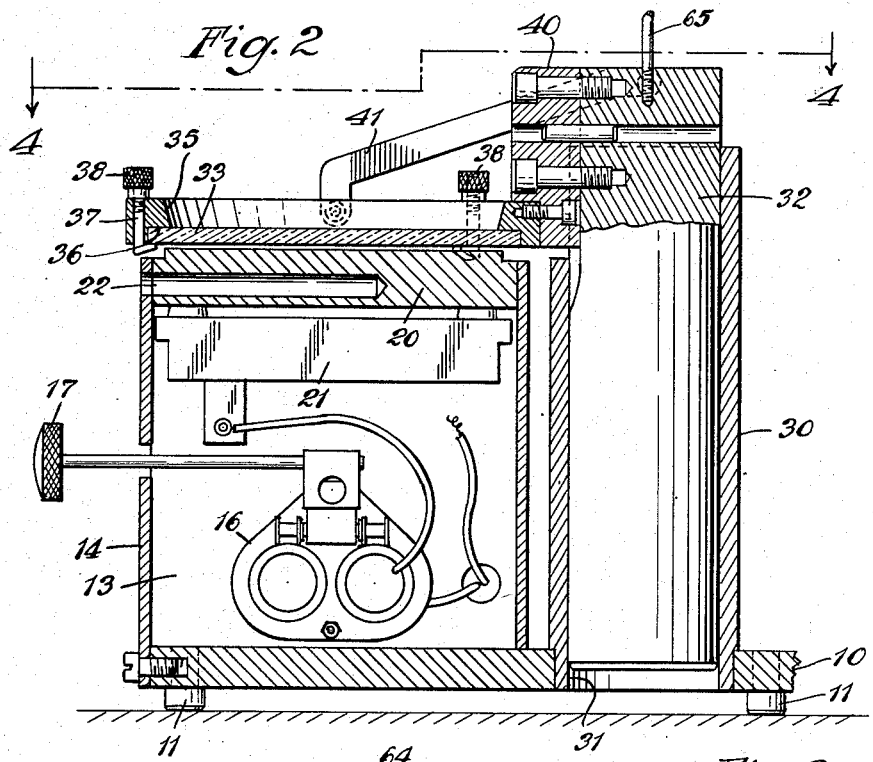
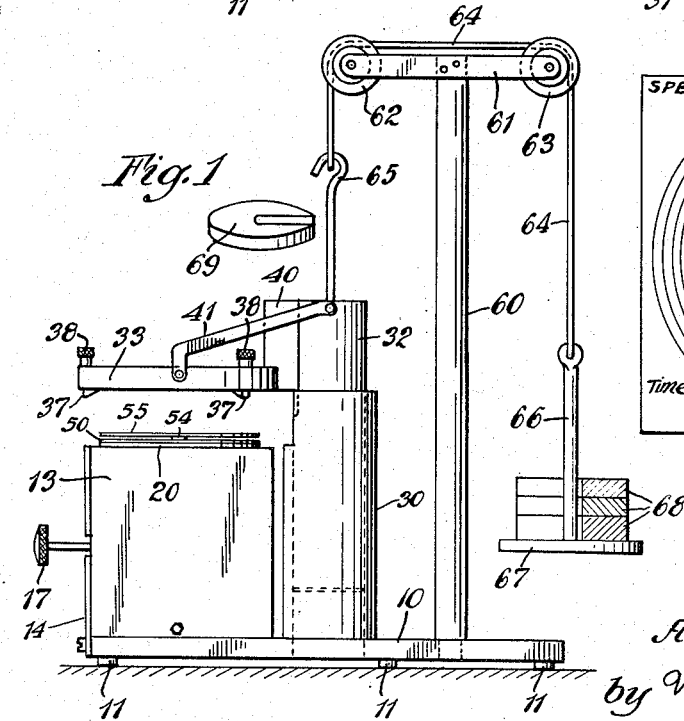
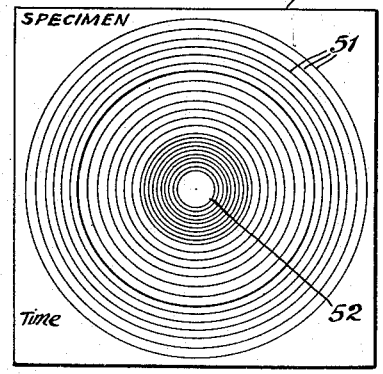
Inventor
Arthur P. Dowling
by W. Bartlett Jones
Attorney Nov. 24, 1953 — A. P. DOWLING — 2,660,051
DEVICE FOR TESTING HOT FLOW
Filed May 15, 1951 — 2 Sheets-Sheet 2
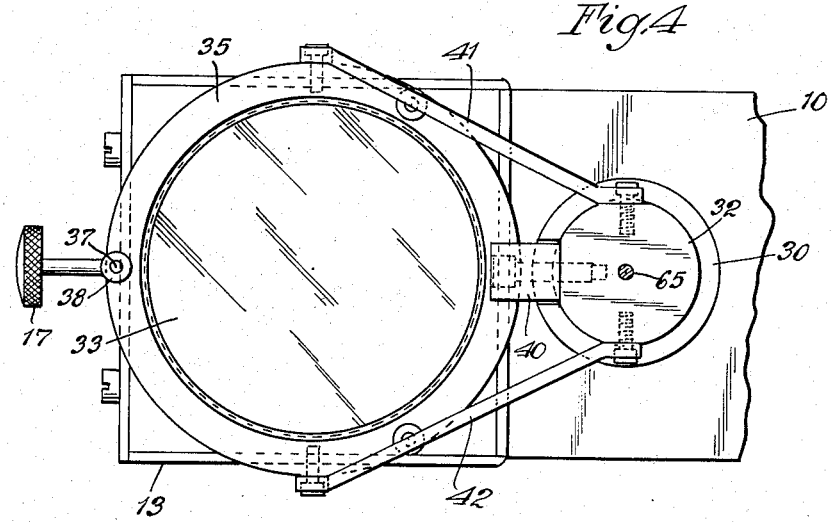
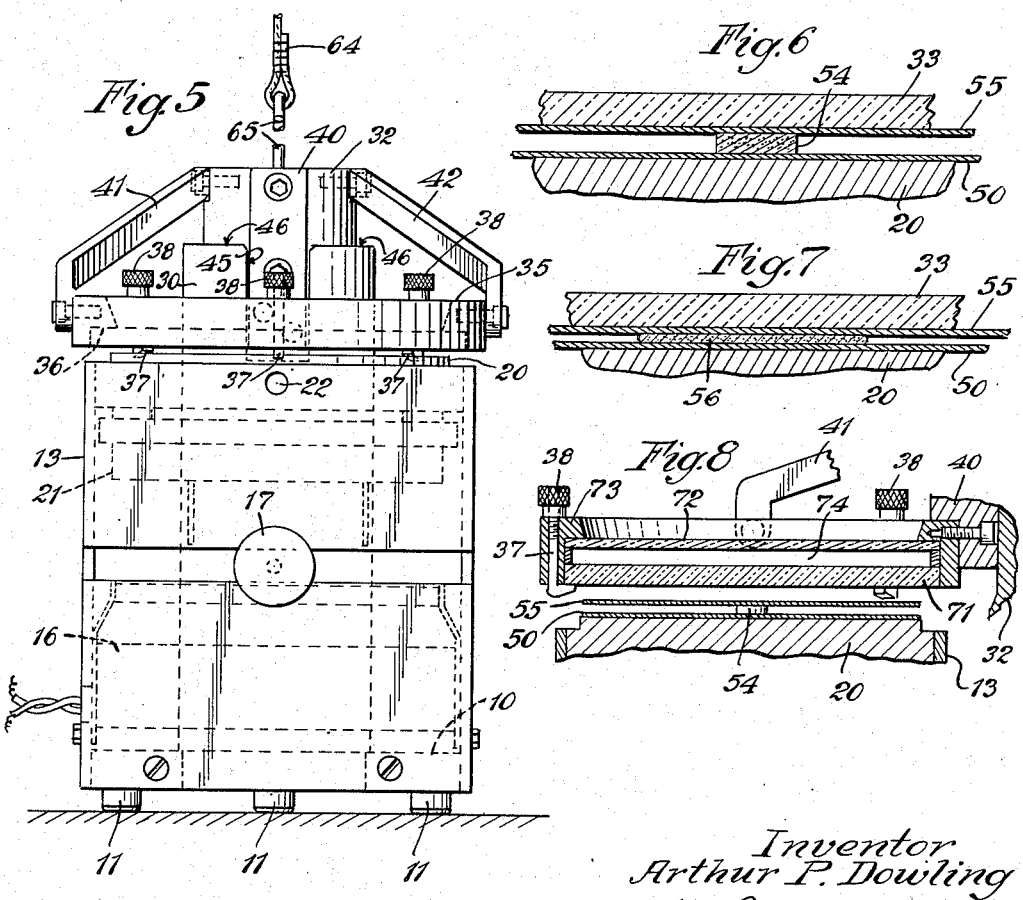
Inventor
Arthur P. Dowling
by W. Bartlett Jones,
Attorney Patented Nov. 24, 1953

2,660,051

UNITED STATES PATENT OFFICE 2,660,051

DEVICE FOR TESTING HOT FLOW

Arthur P. Dowling, Rock Island, Ill., assignor to Rock Island Millwork Company, Rock Island, Ill., a corporation of Illinois Application May 15, 1951, Serial No. 226,436

4 Claims. (Cl. 73—15.6)

The present invention relates generally to testing and testing devices, and in particular to one by which to test the flow characteristics of thermosetting resins which are normally solid, which soften and flow when heated, and which then set or harden.

It has been found that the degree of utility of such resins in certain uses may be predetermined by such a test. For example, in mixing a powdered resin of the type mentioned with granulated wood, such as sawdust, and hot-pressing such a mixture to a panel board, all by standardized procedure, it is known that the strength of the board is relatively lower when the resin has poor flow characteristics, and is relatively higher as the resin tends more to flow. It is the flow of a resin particle in the hot press that extends it to enlarge its ultimate surface for binding one particle to another. The present invention involves a device for determination of flow characteristics, giving values which are comparative under any set of standardized conditions chosen for the test. The test involves (1) pelleting a given weight of the powdered resin to a cylindrical pellet of given diameter and height, and (2) placing the pellet on a plate having a thermostatically controlled predetermined temperature and covered by a movable constant-pressure pressing plate of transparent material.

Under this test the pellet may be seen to soften and spread by flowing under the influence of the pressing plate, and then to set. The diameter to which it spreads and the time to do so are recorded as comparative values for any resin subject to the test.

A preferred modification is to place between the pellet and the bottom plate a piece of paper ruled with concentric circles at the center of which the pellet is located. Also, a sheet of transparent cellophane may be placed between the pellet and the pressing plate. These sheets not only keep the upper and lower plates clean, but they adhere to the thermoset spread-out patch of resin and provide a permanent exhibit of the spread resin, and a permanent record of data pertaining to it when the data is entered on the paper.

It is appreciated that the principles involved in the test above described may be carried out by many devices which might be designed for the purpose, and the present invention is directed to one of these.

It is a general object of the invention to provide a device for testing heat-flowable solids.

It is the object of the invention to provide a flow meter for heat-softenable normally solid thermosetting resin, in which the resin specimen is visible during the test action.

It is an object to provide two constant-pressure squeezing plates for actions to heat and squeeze a specimen, one such plate being transparent to render the action visible, and the other being heated at a constant temperature.

It is another object of the invention to provide a calibrated sheet onto which the resin is placed, then spread and anchored, to serve as an indicator during flow and as a record of results.

Various other and ancillary objects and advantages of the invention will become apparent from the following description and explanation of a simple embodiment of the invention as presently preferred, shown in the accompanying drawings in which:

Fig. 1 is a view in side elevation of the general assembly.

Fig. 2 is a vertical cross-section of the main portion of the device of Fig. 1.

Fig. 3 is a plan view of a ruled paper sheet on which the test is conducted.

Fig. 4 is a plan view of the part shown in Fig. 2, as cut off by line 4—4 in Fig. 2.

Fig. 5 is a front view of the device looking from the left in Figs. 1 and 2.

Figs. 6 and 7 show respectively in vertical cross-section the test area at the beginning of a test and at the end.

Fig. 8 is a modification of the transparent pressure plate for use with greater accuracy at elevated temperatures.

The device shown in the drawings comprises a base 10 having three supporting feet 11. The front part of the base 10 has a housing indicated at 13, closed by a removable front plate 14. Within the housing is an electrical resistance or rheostat 16, with adjusting knob 17, for controlling a heating current of electricity, the wiring for which is conventional and not completely indicated.

At the top of housing 13 is an exposed platform or hot plate 20, below which is an electrical heating unit 21 to which the current is controlled by rheostat 16. A thermometer well 22 is drilled into the hot plate 20 for receipt of a thermostatic control (not shown) to turn on and off the electric current which heats the plate 20. The thermostat is preferably one such that its setting may be varied.

The rear part of base 10 carries an upright post 30 having a cylindrical well 31 therein open at the top. A heavy cylindrical plunger 32 is mounted to turn in the well and to move easily up and down therein. The plunger 32 is the primary part or weighted member which carries a movable transparent pressing plate 33 overlying the hot plate 20.

The plate 33 is preferably of heavy glass, mounted in a ring 35, from the underside against a circular shoulder 36, and held therein by headed bolts 37 passing upwardly through the ring 35 to retaining thumb nuts 38. Ring 35 is secured at its rear to a vertical block 40 secured to the upper front part of plunger 32. Ring 35 is further secured in its normal horizontal position by tiebars 41 and 42 running upwardy from the sides of the ring 35 to the top of plunger 32.

The vertical post 30 is cut away at the top into the well opening 31 to provide a wide vertical opening 45 in the side wall of well 31, to the right and left of which the horizontal top portions of the cylindrical shell 30 are designated as horizontal bases 46. The block 40 snugly but loosely fits into the vertical opening 45 so as to slide freely up and down therein. The opening 45 serves as a guide to position the block 40 and hence the plunger 32 so that the glass plate properly overlies the hot plate, and so that in such position when lowered on a test specimen, the plate may move only vertically thus to press by action of gravity on the specimen. When the plunger 32 is raised to bring the block 40 out of the vertical guide opening 45 the plunger 32 may be turned to rest block 40 on either one of the bases 46. This swings the plate 33 away from its testing location over the hot plate 20, and in raised position.

Numeral 50 indicates an ordinary sheet of paper printed with a series of concentric circles 51 of known diameter, the inner one 52 being preferably the diameter of a pellet 54 of powdered resin placed concentrically thereon.

Thus, in operation, for one set of test conditions, the hot plate 20 is maintained at 250° F. To standardize the test the glass plate 33 is applied hot at a predetermined temperature, say 100° to 105° F. as it may cool thereto from a higher temperature resulting from a test immediately preceding it. By use of a contact pyrometer the temperature of glass plate 33 may be quickly measured, and the set-up completed.

Testing involves any convenient way of placing the pellet 54 at the center circles 51 on paper 50, and preferably under a transparent cellophane or like sheet 55, against the underside of glass 33 pressing thereon. As the heat is conducted to the pellet, the latter softens, coalesces and flows, then sets and hardens. The hardening causes flow to cease. By measuring the time or times from the beginning or between any two critical conditions, against the flow or spread, comparative data are available. Critical points are:

Start
    Begin to flow
    Completion of coalescence
    Cessation of flow

Fig. 6 shows the conditions at the beginning of a test. The pellet 54 is centered on the rings of sheet 50, on hot plate 20, covered by cellophane sheet 55. Constant pressure from glass 33 is applied as the assembly 50—54—55 is placed on the hot plate. The placement is effected when the glass 33 has a predetermined temperature arrived at by heating or cooling. A chronometer is used to mark time against observations. The pellet, when made of compressed powder, softens, coalesces and spreads, finally setting in a flattened cake shown at 56 in Fig. 7. It adheres to the sheets 50 and 55 between which it may be preserved for reference. Fig. 3 shows corners of sheet 50 marked for entry of data.

The device may be made variable by changing the pressure applied, as well as the temperature. One way is to change the weight of plunger 32 by counterbalancing. To do this, there is a post 60 on base 10, with a cross-arm 61 at the top, having at the ends pulleys 62 and 63, over which runs cord 64. One end of cord 64 is attached to a long shanked hook 65 near the center of plunger 32. The other end carries a long stem 66 centered on a disk 67 at its bottom, on which slotted weight disks 68 may be removably piled. The same weights may be placed on the plunger 32, as indicated by weight 69 in Fig. 1 in position to move onto the hook 65.

Fig. 8 shows a modified pressing plate in which two spaced transparent disks 71 and 72 are mounted on a modified ring 73. Where higher temperatures are used, or more slowly setting specimens are under test, or both, the temperature of the lower plate 72 is better maintained by the insulating character of the air space 74.

Various other changes and modifications of the device as illustrated are contemplated as falling within the scope of the invention as expressed in the appended claims.

I claim:

1. A testing device comprising two relatively movable members providing parallel opposed surfaces normal to which the members are relatively movable, one of said members being transparent and positioned without obstruction to visual observation therethrough whereby to permit observations of a solid body being compressed between said members, means to heat one of said members whereby to heat said body, and means to urge said members together with constant pressure on said body, whereby an operator may observe through the transparent member the action of said body to said heat and mechanical pressure.

2. A testing device comprising two relatively movable parallel plates horizontally disposed and vertically movable relative to each other, means to heat one plate to affect a solid body placed between said plates, and means urging the plates together to exert a constant pressure on said solid body, one plate being transparent and positioned without obstruction to visual observation therethrough whereby change in character of the solid body under influence of the heat and of the mechanical pressure may be observed.

3. A testing device comprising means providing a substantially horizontal platform, means for heating the platform to affect a solid body on the platform, a horizontal transparent movable presser plate arranged to exert constant follow-up pressure on said solid body on said platform as the body yields thereto under influence of heat from the platform, said transparent presser plate being positioned without obstruction to visual observation therethrough during its movement in compressing the material of said body.

4. A testing device comprising a fixed body providing a substantially horizontal platform, means to heat said platform, a transparent rigid plate movable toward and away from said platform, said plate being positioned without obstruction to visual observation therethrough during its said movement, means to weight said plate by gravity to move it with constant pressure on a solid body on said platform, the location and transparency of said plate permitting visualization of the effects of heat and mechanical pressure on said solid body.

ARTHUR P. DOWLING.

References Cited in the file of this patent

UNITED STATES PATENTS

| Number | Name | Date |
|---|---|---|
| 2,058,805 | Lee | Oct. 27, 1936 |
| 2,222,470 | Barnes | Nov. 19, 1940 |
| 2,259,491 | Roller | Nov. 19, 1940 |
| 2,302,224 | Jones | Nov. 17, 1942 |
| 2,574,715 | Sontag | Nov. 13, 1951 |